(12) United States Patent
Kadiam et al.

(10) Patent No.: US 11,093,499 B2
(45) Date of Patent: Aug. 17, 2021

(54) TECHNIQUES FOR OPTIMIZING GRAPH DATABASE QUERIES

(71) Applicant: Microsoft Technology Licensing, LLC, Redmond, WA (US)

(72) Inventors: Chandrashekhar Kadiam, Bothell, WA (US); Craig Steven Freedman, Sammamish, WA (US); Daniel Georg Schall, Woodinville, WA (US); Devin Leo Rider, Renton, WA (US); Nitish Jindal, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 262 days.

(21) Appl. No.: 16/297,217

(22) Filed: Mar. 8, 2019

(65) Prior Publication Data
US 2020/0285643 A1    Sep. 10, 2020

(51) Int. Cl.
| | |
|---|---|
| G06F 16/24 | (2019.01) |
| G06F 16/2453 | (2019.01) |
| G06F 16/2455 | (2019.01) |
| G06F 16/901 | (2019.01) |
| G06F 11/34 | (2006.01) |

(52) U.S. Cl.
CPC .... G06F 16/24542 (2019.01); G06F 11/3414 (2013.01); G06F 16/24566 (2019.01); G06F 16/9024 (2019.01)

(58) Field of Classification Search
CPC ....... G06F 16/24534; G06F 16/024542; G06F 16/24566
See application file for complete search history.

(56) References Cited

U.S. PATENT DOCUMENTS

| | | | |
|---|---|---|---|
| 2017/0116271 A1 | 4/2017 | Ziauddin et al. | |
| 2019/0196890 A1* | 6/2019 | Bucchi | G06F 16/24545 |

OTHER PUBLICATIONS

"Recursive Queries Using Common Table Expressions", Retrieved from: http://web.archive.org/web/20130811012935/http://technet.microsoft.com/en-us/library/ms186243%28v=sql.105%29.aspx, Aug. 11, 2013, 6 Pages.

Bolton, et al., "Professional SQL Server 2012 Internals and Troubleshooting, Chapter 1 SQL Server Architecture", In Book of Professional SQL Server 2012 Internals and Troubleshooting, Jan. 1, 2013, 29 Pages.

(Continued)

*Primary Examiner* — Baoquoc N To
(74) *Attorney, Agent, or Firm* — Arent Fox LLP

(57) ABSTRACT

Examples described herein generally relate to executing a received graph database query. The received graph database query can be converted into a recursive common table expression (CTE). Multiple alternative processes for executing the recursive CTE can be generated based on the recursive CTE. A cost associated with each of the multiple alternative processes can be determined. One of the multiple alternative processes can be converted into a multi-step sequence based on the associated cost. The multi-step sequence can be executed on a database to retrieve a set of results in response to the received graph database query.

20 Claims, 13 Drawing Sheets

(56) References Cited

OTHER PUBLICATIONS

Jorgensen, et al., "Microsoft SQL Server 2012 Bible. Chapter 13 Working with Hierarchies and Chapter 16 Programming with T-SQL", In Book of Microsoft SQL Server 2012 Bible, Jan. 1, 2012, 58 Pages.

"International Search Report & Written Opinion issued in PCT Application No. PCT/US20/020571", dated May 27, 2020, 13 Pages.

Sheldon, Robert, "SQL Server Graph Databases—Part 4: Working with Hierarchical Data in a Graph Database", Retrieved From: https://web.archive.org/web/20180510135710/https://www.red-gate.com/simple-talk/sql/t-sql-programming/sql-server-graph-databases-part-4-working-hierarchical-data-graph-database/, Apr. 23, 2018, 22 Pages.

* cited by examiner

300

400

| Node Table 'Employee' | | |
|---|---|---|
| NodeID | EmployeeName | Role |
| N1 | ar1 | Architect |
| N2 | emp1 | Receptionist |
| N3 | ar2 | Architect |
| N4 | pm1 | PM |

500

| Edge Table 'WorkingWith' | | |
|---|---|---|
| EdgeID | FromNode | ToNode |
| Edge1 | N1 | N2 |
| Edge2 | N2 | N3 |
| Edge3 | N2 | N4 |
| Edge4 | N3 | N4 |

600

```
       SELECT * FROM Employee n1, WorkingWith e1, Employee n2
602  603                              606
       WHERE MATCH(shortest_path(n1(-(e1)->n2)+) and
                        608              610
604              n1.Role = 'Architect' and n2.Role = 'PM'
```

*Figure 6*

| 700 | All paths 702 | | All paths between Architects and Program Managers 704 | Shortest path between all Architects and Program Managers 706 |
|---|---|---|---|---|
| | N1-N2 | N2-N1 | N1-N2-N3-N4 | N1-N2-N4 |
| | N1-N2-N3 | N2-N3 | N1-N2-N4 | N3-N4 |
| | N1-N2-N3-N4 | N2-N3-N4 | N3-N4 | |
| | N1-N2-N4 | N2-N4 | N3-N2-N4 | |
| | N1-N2-N4-N3 | N2-N4-N3 | | |
| | N3-N4 | N4-N3 | | |
| | N3-N4-N2 | N4-N3-N2 | | |
| | N3-N4-N2-N1 | N4-N3-N2-N1 | | |
| | N3-N2 | N4-N2 | | |
| | N3-N2-N1 | N4-N2-N1 | | |
| | N3-N2-N4 | N4-N2-N3 | | |

Query - 802

```
select * from n1, n2, n3, e1, e2 where match(shortest_path(n1(-(e1)->n2-(e2)->n3)+))
```

Effective Query - 804

```
with x (e1_from_id, e1_from_obj_id, e2_to_id, e2_to_obj_id, depth) as (
    select e1.from_id, e1.from_obj_id, e2.to_id, e2.to_obj_id, 1
    from e1 inner join e2
         on e1.to_id = e2.from_id
    left outer join n2
         on n2.graph_id = e2.from_id
    where e1.to_obj_id = object_id('n2') and e2.from_obj_id = object_id('n2')

union all select x.e1_from_id, x.e1_from_obj_id, e2.to_id, e2.to_obj_id, x.depth + 1
    from x inner join e1
         on x.e2_to_id = e1.from_id
    inner join e2
         on e1.to_id = e2.from_id
    left outer join n2
         on e2.from_id = n2.graph_id
    left outer join n3
         on x.e2_to_id = n3.graph_id
    where x.e2_to_obj_id = object_id('n3')
         and e1.from_obj_id = object_id('n3')
         and e1.to_obj_id = object_id('n2')
         and e2.from_obj_id = object_id('n2')
)
select *
from x left join n1
     on x.e1_from_id = n1.graph_id
left join n3 on x.to_id = n3.graph_id
where x.e1_from_obj_id = object_id('n1')
     and x.to_obj_id = object_id('n3')
```

CTE Select List 806

Anchor Member 808

Recursive Member 810

Outer Select Query 812

ShortestPath ( n1 ( - (e) -> n2 ) + ) AND ShortestPath ( LastNode (n2) ( - (e2) -> n3 ) + )
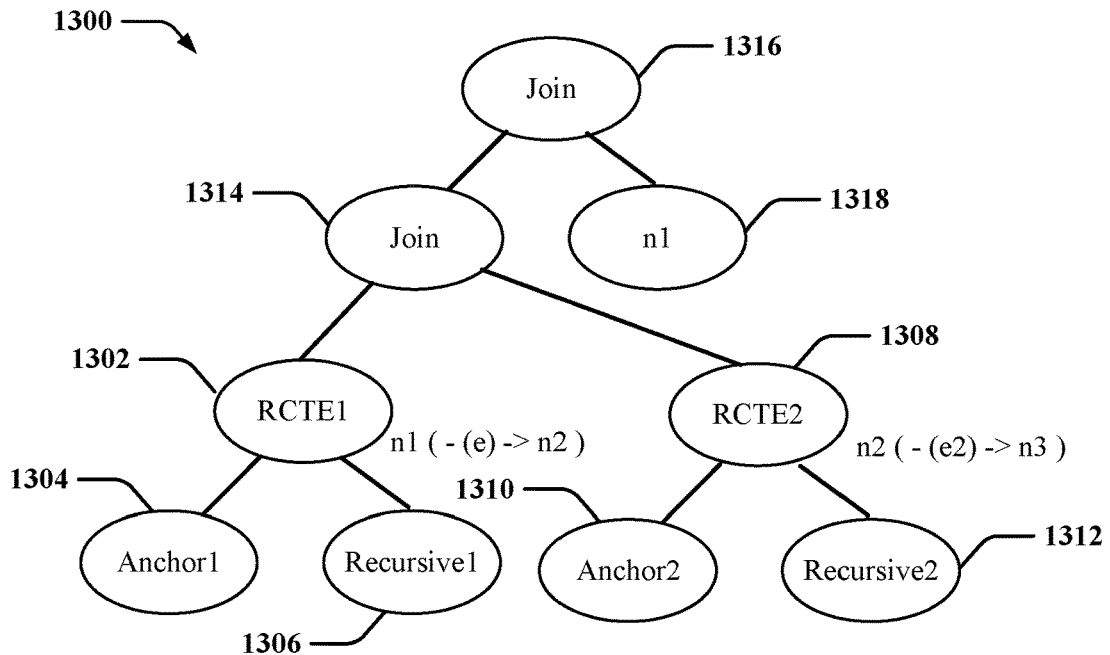
Alternative Process
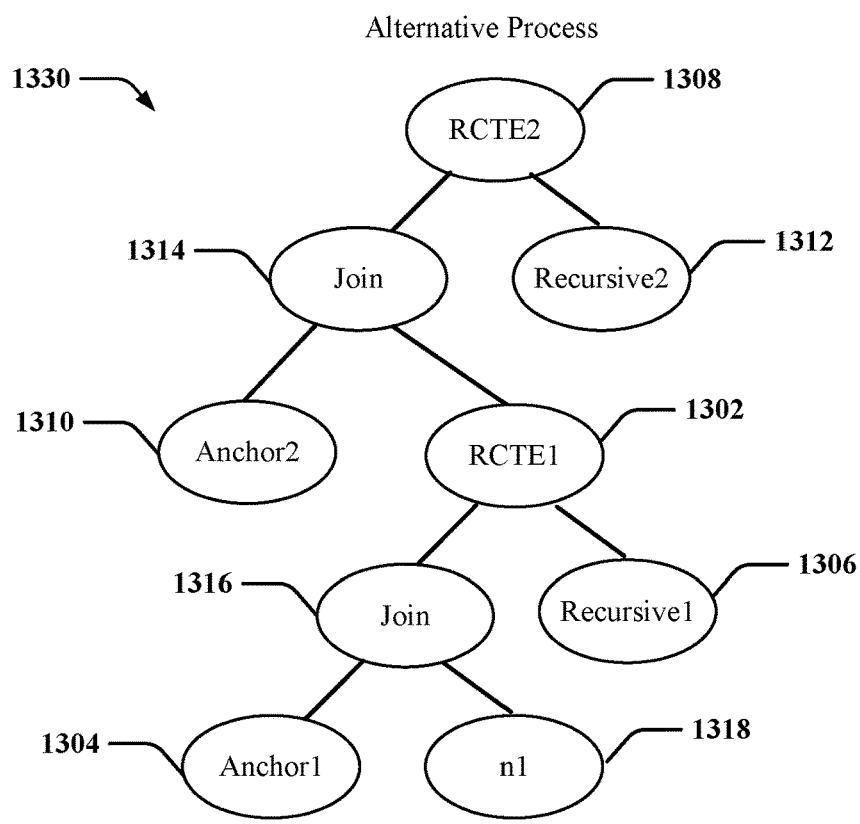
*Figure 13*

TECHNIQUES FOR OPTIMIZING GRAPH DATABASE QUERIES

BACKGROUND

Use of computing devices is becoming more ubiquitous by the day, include devices for efficient storage and recall of data. Relational database systems, and applications written to leverage such systems, have been provided for describing, storing and retrieving data. More recently, there has been an increased demand for graph database systems where, instead of the traditional columns and rows of a relational database table, graph databases store data in form of nodes and edges. A node represents a distinct data value or set of related values, and edges connect the nodes and thus represent relationships between the nodes. For example, data related to company employees may be represented by a node for each employee, and edges may connect employees that work with one another, representing the relationships of co-workers. A complete picture of all the nodes with all interconnecting edges is referred to as a graph.

Storing information in the form of a graph (as opposed to a native relational database table) and performing graph queries can be desirable under certain circumstances. For example, graph storage can be desirable where a business application or its underlying data involve complex many-to-many relationships, or to analyze the relationships that underlie the data. In these situations, graph storage and query capabilities can be useful since a graph database system can typically allow simplified expression of certain types of queries. For example, pattern matching, multi-hop navigation, transitive closure and polymorphic queries can be easier to express with a graph query.

Relational database systems can be used to represent and perform functions associated with a graph database system. In particular, the nodes and edges that comprise a graph may be stored in ordinary relational tables referred to as node and edge tables. Node tables store information or references relevant to a particular node (e.g., employee), and an edge table reflects the relationship (e.g., co-worker) between nodes in the node table.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for executing a received graph database query is provided. The method includes converting the received graph database query into a recursive common table expression (CTE), generating, based on the recursive CTE, multiple alternative processes for executing the recursive CTE, determining a cost associated with each of the multiple alternative processes, converting, based on the cost, one of the multiple alternative processes into a multi-step sequence, and executing, on a database, the multi-step sequence to retrieve a set of results in response to the received graph database query.

In another example, a computing device for executing a received graph database query is provided. The computing device includes a database storing data representing a graph database, a memory storing one or more parameters or instructions for querying the graph database, and at least one processor coupled to the memory. The at least one processor is configured to converting the received graph database query into a recursive CTE, generating, based on the recursive CTE, multiple alternative processes for executing the recursive CTE, determining a cost associated with each of the multiple alternative processes, converting, based on the cost, one of the multiple alternative processes into a multi-step sequence, and executing, on the database, the multi-step sequence to retrieve a set of results in response to the received graph database query.

In another example, a non-transitory computer-readable medium, including code executable by one or more processors for executing a received graph database query is provided. The code includes code for converting the received graph database query into a recursive CTE, generating, based on the recursive CTE, multiple alternative processes for executing the recursive CTE, determining a cost associated with each of the multiple alternative processes, converting, based on the cost, one of the multiple alternative processes into a multi-step sequence, and executing, on a database, the multi-step sequence to retrieve a set of results in response to the received graph database query.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

BRIEF DESCRIPTION OF THE DRAWINGS

FIG. 6 shows an example graph query that may be submitted to, and processed by, examples.

FIG. 7 shows a table illustrating possible traversal paths through the nodes of graph of FIG. 3 according to various constraints.

FIG. 8 shows a query including a repeated MATCH expression, and a conceptual effective query generated by transformation of the query, according to an example.

FIG. 13 shows alternative query process trees for more than one recursive CTE, according to an example.

DETAILED DESCRIPTION

Figure 1:
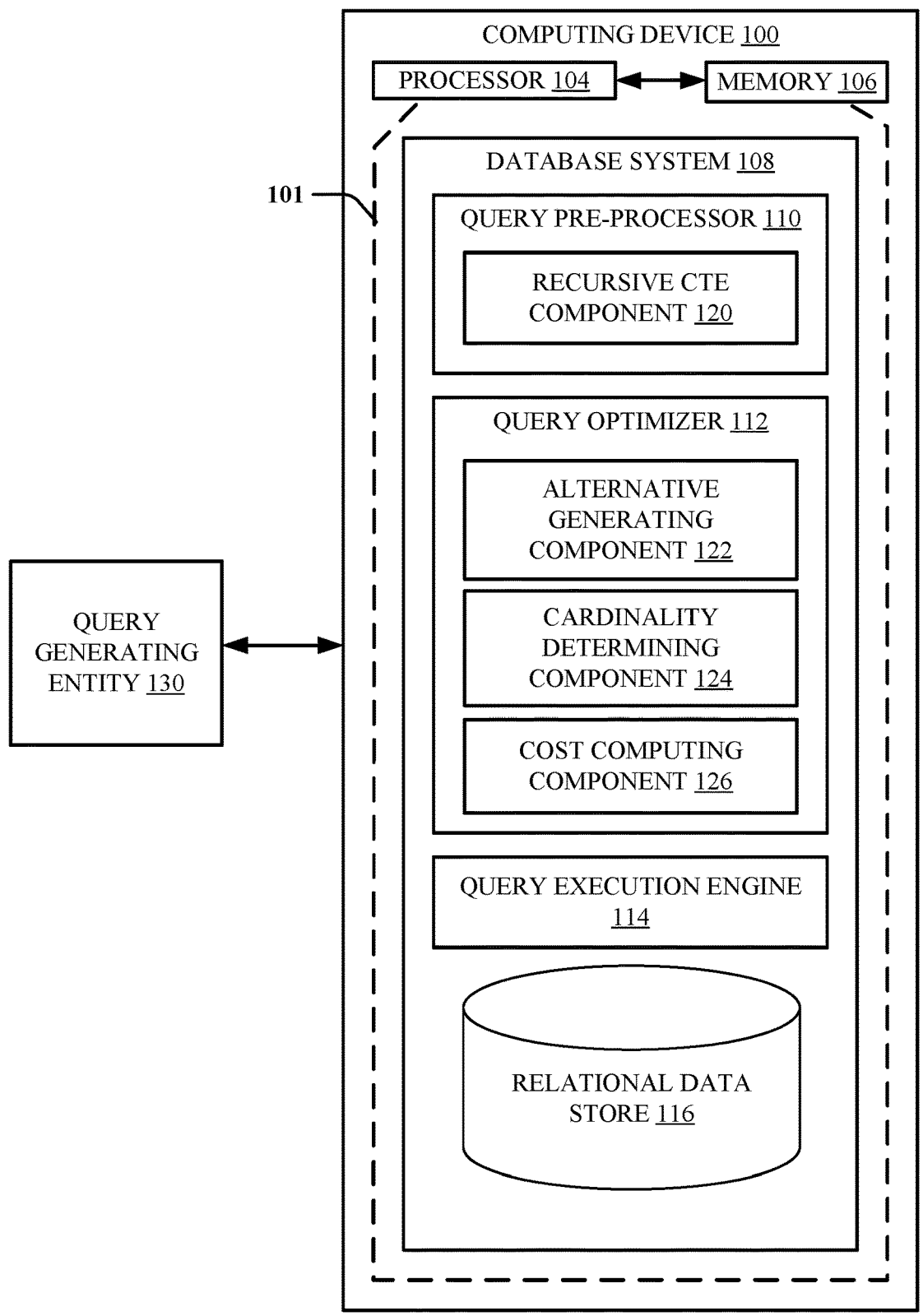
FIG. 1 is a schematic diagram of an example of a computing device for optimizing graph database queries in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to optimizing graph database queries. For example, the graph database can include a set of nodes and a set of edges connecting the nodes, where the edge can represent a relationship or other data corresponding to the nodes. In an example, a graph database can be represented using a relational database system, and the query language for the relational database system can allow for certain graph database functions, such as determining a shortest path between two nodes in the graph database. Given a query for the graph database, in an example, the query can be converted into a recursive common table expression (CTE) where tables of the relational database system can be formed in processing the query, and the tables can repeatedly reference themselves to achieve a resulting query result set. Recursive CTEs can be defined as having one or more anchor members (or "anchor children") and one or more recursive members (or "recursive children"). The anchor member(s) can be executed once, and the recursive member(s) can be recursively executed until: no new results are provided by an execution of the recursive member and/or all previously produced results have been consumed; all of the results for the query are found; and/or a maximum desired path length is reached without finding all of the results. Various optimizations, described herein, can be provided to the recursive CTE to allow for achieving a more efficient query result.

For example, multiple alternative processes for executing the recursive CTE can be generated, which may include different optimizations. In one example, an alternative to represent a shortest path query can be generated in a different direction from an original query. In another example, an alternative can be generated to move node filtering operations (e.g., a join statement) into an anchor member of the recursive CTE, and/or moving or copying an instance of another recursive CTE into an anchor member of the recursive CTE (e.g., where the query has two shortest path queries, one representative recursive CTE can be pushed down into an anchor member of the other recursive CTE). For each of the multiple alternatives, an associated cost can be determined based on one or more cardinality metrics associated with operations defined in the given alternative. For example, the cardinality metrics may include a diameter or fan-out metric of a graph produced by an operation in the alternative, a number of nodes (e.g., start and/or end nodes) of a graph produced by an operation in the alternative, etc. One of the alternatives can be selected based at least on the cost, and may be used as a multi-step sequence to query the database and receive the resulting query set.

Turning now to FIGS. 1-16, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

Figure 2:
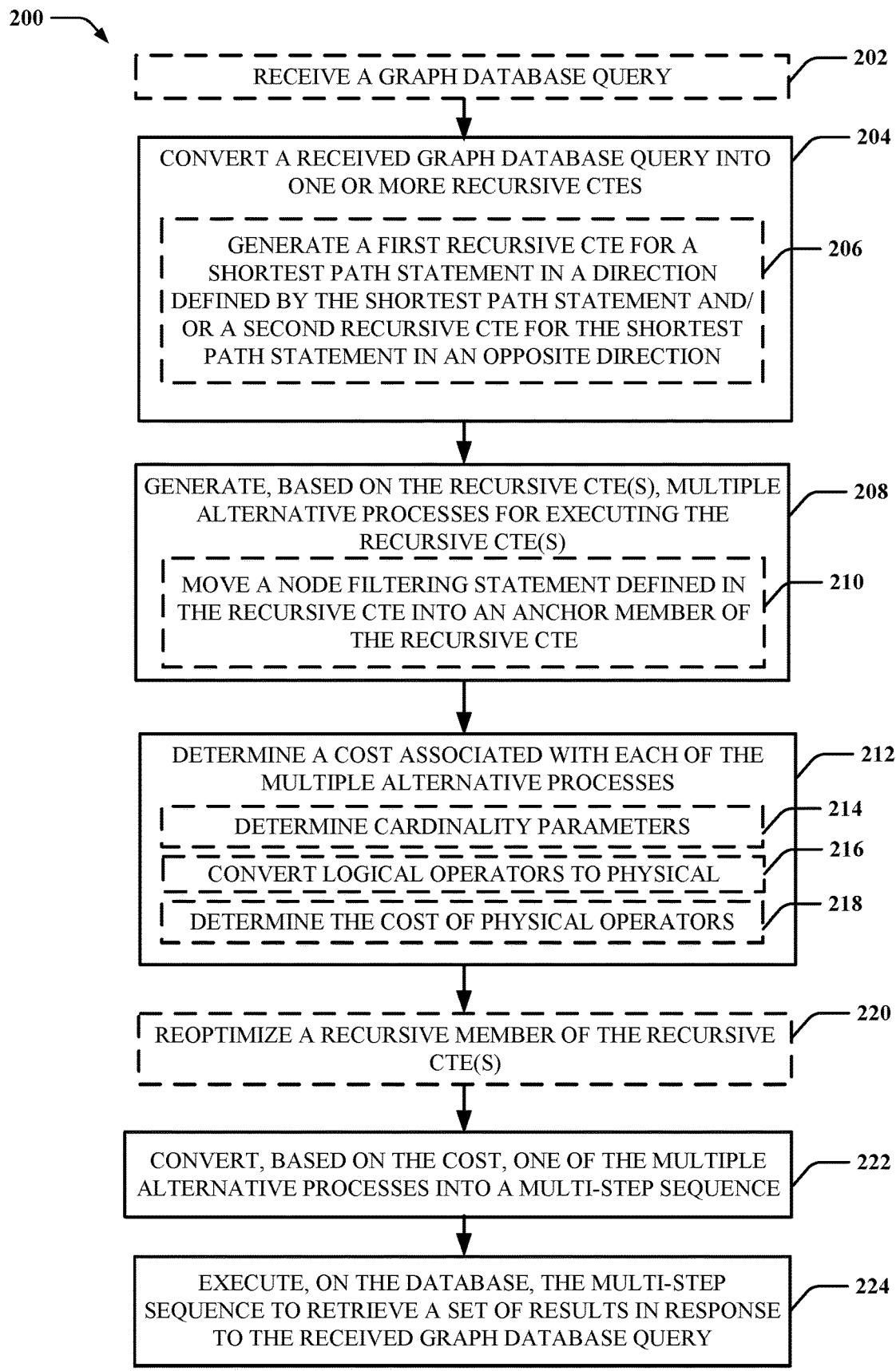
FIG. 2 is a flow diagram of an example of optimizing graph database queries in accordance with examples described herein.

FIG. 1 is a schematic diagram of an example of a computing device 100 and/or related components for optimizing graph database queries in accordance with aspects described herein. For example, computing device 100 can include or can otherwise be coupled with a processor 104 and/or memory 106, where the processor 104 and/or memory 106 can be configured to execute or store instructions or other parameters related to storing and/or managing a graph database, processing queries to retrieve data from the graph database, add data to the graph database, modify data in the graph database, remove data from the graph database, etc., as described herein. For example, processor 104 and memory 106 may be separate components communicatively coupled by a bus (e.g., on a motherboard or other portion of a computing device, on an integrated circuit, such as a system on a chip (SoC), etc.), components integrated within one another (e.g., processor 104 can include the memory 106 as an on-board component 101), and/or the like. Memory 106 may store instructions, parameters, data structures, etc., for use/execution by processor 104 to perform functions described herein.

In an example, computing device 100 can execute a database system 108 (e.g., via processor 104 and/or memory 106) for generating, maintaining, etc. a graph database, which can be represented as a series of nodes and edges between the nodes, as described. In an example, database system 108 can include a query pre-processor 110 for performing one or more pre-processing steps for a received query, as described herein, before providing instructions to a query optimizer 112 to further process the query. The query optimizer 112 can translate the query into multiple logical operations for obtaining data based on the query. As described further herein, the query optimizer 112 can perform multiple processing steps to generate an optimized multi-step sequence based on the received query, and can provide the multi-step sequence to a query execution engine 114 to execute the steps with respect to a relational data store 116 that has data representing the graph database. For example, relational data store 116 can be a relational database that stores data in relational entities, such as rows of tables, etc.

In an example, query pre-processor 110 can include a recursive CTE component 120 for translating a received query into a recursive CTE. In an example, query optimizer 112 can include an alternative generating component 122 for generating alternatives for the recursive CTE or representations thereof (e.g., alternative sets of logical operators) for executing the query, a cardinality determining component 124 for determining a cardinality metric associated with one or more tables potentially retrieved in executing the query, and/or a cost computing component 126 for computing a cost associated with each of the alternatives. As such, the query optimizer 112 can select an alternative for the recursive CTE that has a desirable associated cost (e.g., a lowest cost of the alternatives, less than a threshold cost, etc.). In addition, a query generating entity 130 is shown for generating a query to be executed on the database system 108 and/or to receive a resulting data set. In an example, query generating entity 130 may be a separate computing device than computing device 100, a portion of the computing device 100, attached to the computing device 100, remotely located from the computing device 100 (e.g., and communicating therewith via one or more networks), and/or the like. In any case, database system 108 can be configured to receive queries from the query generating entity 130 and can provide results thereto and/or to another entity, etc.

FIG. 2 is a flowchart of an example of a method 200 for optimizing graph database queries. For example, method 200 can be performed by the computing device 100, and is accordingly described with reference to FIG. 1, as a non-limiting example of an environment for carrying out method 200. In addition, at least a portion of the actions illustrated in method 200 can be performed independently of one another or as a series of actions, based on examples described herein, and/or can be performed in substantially any order and/or with additional steps omitted for ease of explanation.

In method 200, optionally at action 202, a graph database query can be received. In an example, query pre-processor 110, e.g., in conjunction with processor 104, memory 106, database system 108, etc., can receive the graph database query. For example, database system 108 can allow for storing a graph database represented as a collection of relational database constructs (e.g., tables, rows in the tables, etc.) within relational data store 116. In one example, relational data store 116 can store a table representing a collection of nodes, a table representing edges between the nodes, and/or the like.

Figures 3, 4, 5:
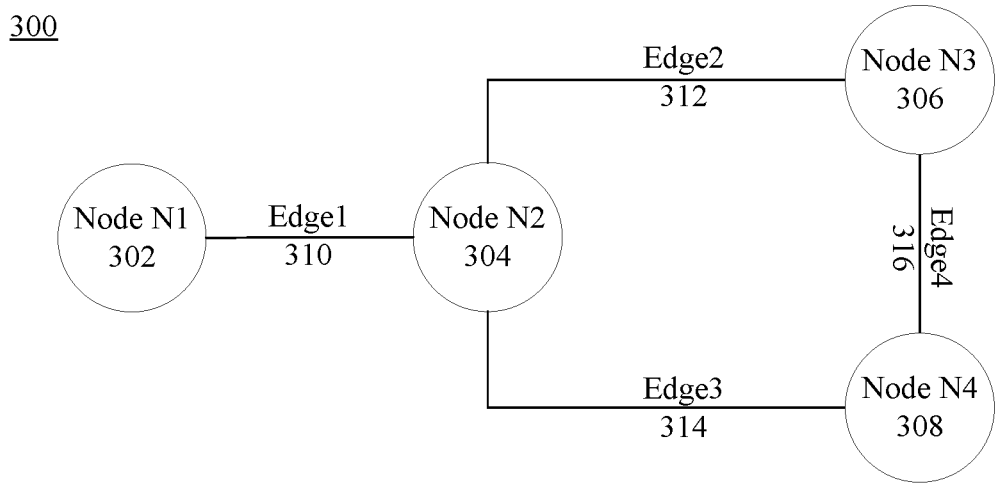
FIG. 3 shows an example graph reflecting co-worker relationships (edges) between workers (nodes).
FIG. 4 shows an example relational database node table that describes properties associated with the nodes shown in the graph of FIG. 3.
FIG. 5 shows an example relational database edge table that describes how the nodes shown in FIG. 3 and reflected in the node table of FIG. 2, are connected.

In a specific example, database system 108 can represent a graph database using relational data store 116 similar to the examples depicted in FIGS. 3-5. FIG. 3 shows an example graph 300 reflecting co-worker relationships (edges) between workers (nodes). Graph 300 of FIG. 3 includes nodes N1-N4 enumerated with reference numerals 302-308, respectively. Graph 300 also includes edge1-edge4 enumerated with reference numerals 310-316, respectively. As described briefly above, nodes N1 302 through N4 308 represent workers at a company. Edge1 310 through edge4 316, on the other hand, represent relationships between the workers. In this example, edges represent a "working with" relationship. That is, nodes connected by edges are workers that have a co-worker relationship (i.e., they work with one another). Graph 300 of FIG. 3 is merely a conceptual visualization tool. In addition, graph 300 is directional, however the concepts described herein can be similarly applied to non-directional graphs as well. Data that embodies graph 300 can be stored differently than what is illustrated in graph 300 of FIG. 3.

For example, FIG. 4 illustrates an example relational database node table 400 that describes properties associated with the nodes shown in the graph of FIG. 3, and may be stored in relational data store 116 as part of the graph database to represent the graph 300. Node table 400 is stored in a relational database as a table, and in this example is named "Employees." Node table 400 includes three columns that store information related to each node. In particular, each row of node table 400 includes a NodeID, Employee Name and Role. The EmployeeName for at each node simply reflects the name of that employee. In table 400 of FIG. 4, the EmployeeName included in each node (i.e., row of the table) is merely shorthand. In an actual graph that reflects actual production data, one may expect to see the actual names of people.

Each node of node table 400 also includes a Role for that particular employee. For example, the employees illustrated by nodes in graph 300, and embodied in node table 400, may be an Architect as shown at node N1 302 or N3 306, a receptionist as shown at node N2 304, or a PM (i.e., "Program Manager") as shown at node N4 308. Each node included in node table 400 also includes a NodeID that uniquely identifies each node and, as described below, also serves to identify the nodes connected by the edges of edge table 500 of FIG. 5.

Edge table 500 of FIG. 5 may likewise be stored in the relational data store 116 along with node table 400 as part of the graph database to represent the graph 300. In this example, edge table 500 is named "WorkingWith." Edge table 500 includes three columns to define each edge. The columns are: Edge ID, FromNode and ToNode. Each row corresponds to an edge of graph 300. The edgeID in each row uniquely identifies each edge. The FromNode of each row includes the NodeID of one of the nodes connected by that edge, and the ToNode includes the NodeID of the other node connected by the edge. Note, in this example, the node table reflects a "to" and "from" relationship (i.e. a directed graph). It should be understood, however, that examples are enabled to function with any type of graph, directed or otherwise.

Taking node table 400 and edge table 500 together, and with reference to FIG. 3, one can see that these tables reflect the nodes of graph 300, and the edges serving to interconnect such nodes. In examples, after node table 400 and edge table 500 have been created and persisted to the relational database system, a user may seek to execute graph queries against the data.

For example, FIG. 6 shows an example graph database query 600 that may be submitted to, and processed by, the query pre-processor 110, database system 108, etc., in examples. FIG. 6 is described as follows with respect to FIG. 7. FIG. 7 shows a table 700 illustrating possible traversal paths through the nodes of graph of FIG. 3 according to various constraints. The discussion immediately below of FIGS. 6 and 7 serve to generally describe query 600 and the type of data such a query may return, in certain examples. Details of other examples describing processing of query 600 to generate a physical query plan are discussed below.

Query 600 of FIG. 6 is an example of a graph database query drafted using Transact-SQL ("T-SQL") syntax, according to an example. Query 600 comprises one statement including three clauses: SELECT clause 602, FROM clause 603 and WHERE clause 604. Query 600 operates as an implicit JOIN of the Employees table, the WorkingWith table, and again the Employees table, with the results filtered by WHERE clause 604. Note, since the query is computing a recursive result, examples take FROM clause 603 and WHERE clause 604 (including the recursive MATCH predicate 606 discussed below) together to compute the results rather than strictly computing a cartesian product.

WHERE clause 604 includes 3 conditions or predicates 606, 608, and 610. Predicate 606 specifies a recursive MATCH condition that includes a shortest path between starting node n1 and ending node n2, wherein nodes n1 and n2 satisfy predicates 608 and 610, respectively. Predicate 608 indicates that the Role of each matching start node equals 'Architect.' Similarly, Predicate 610 indicates that the Role of each matching ending node equals 'PM.' The query result of query 600 is then generated by applying the conditions of WHERE clause 604 to the results of SELECT statement 602. In particular, the query result returns the shortest path between every Architect and every Program Manager in the graph database stored in corresponding tables of relational data store 116 (e.g., as shown in graph 300 of FIG. 3), and as embodied by node table 400 and edge table 500.

The query result of query 600 may be better understood by considering FIG. 6. Table 700 of FIG. 7 illustrates the possible traversals paths through the nodes of graph 300 of FIG. 3 according to various constraints. Table 700 includes three columns including: all paths 702, all paths between Architects and Program Managers 704 and shortest path between all Architects and Program Managers 706. The paths illustrated in table 700 of FIG. 7 assume that no node can be traversed more than once. It should be understood, however, that no particular traversal restrictions or rules are required nor assumed. For instance, one could create a similar table of traversals for any "recursive" query including weighted shortest path, top k shortest path, or all paths, etc.

The first column 702 of table 700 illustrates all possible traversal paths through graph 300 from each node to all other nodes through all paths. For example, consider the upper left quadrant of column 702, with reference to graph 300 of FIG. 3, in which 5 paths are illustrated starting at node N1 302 of graph 300, and ending at each of the other nodes N2-N4. In particular, paths include: N1 to N2, N1 to N2 to N3, N1 to N2 to N3 to N4, N1 to N2 to N4, and N1 to N2 to N4 to N3. It can be shown that this is an exhaustive list of possible traversal paths from N1 to the other nodes N2-N4 (and where cycles or loops where a node is traversed more than once are not permitted in any path). The paths from N2, N3 and N4 to all of the other nodes are illustrated in the upper-right, lower-left and lower-right quadrants, respectively, of the column 702 of table 700. This exhaustive list of traversal paths is provided only for the sake of context and completeness since, for example, the traversal of graph 300 required to evaluate query 600 would typically not start on any nodes other than architects (i.e., N1 and N3). In examples, however, bidirectional traversal may be performed whereby graph 300 is traversed in both directions starting with both architects and Program Managers (but no other nodes), and working until the traversals meet in the middle.

Now consider column 704 of table 700, wherein constraints are placed on traversal paths. In particular, column 704 illustrates traversal paths of graph 300 of FIG. 3 where start nodes are restricted to Architects, and end nodes are restricted to Program Managers. As shown in node table 400 of FIG. 4, only one employee has the Role of PM corresponding to node N4 308. Accordingly, all paths in column 704 end on N4. Similarly, only N1 and N3 of graph 300 correspond to employees with the Role of Architect, which can result in the paths of column 704 starting on either nodes N1 or N3. As is apparent, the paths of column 704 can be an exhaustive list of such paths.

Finally, consider column 706 of table 700 where an additional constraint is imposed on otherwise valid traversal paths shown in column 704. In particular, the paths shown in column 706 satisfy not only the conditions required to produce the paths in column 704, but also constitute the shortest paths (as measured by the number of hops since the edges in this case all have equal weights) between all architects and all program managers. Thus, there is one path between N1 and N4, and between N3 and N4, and these paths are the shortest paths between the respective endpoints. The paths shown in column 706 are the rows returned by query 600 of FIG. 6. In any case, the database system 108 can perform a search of the graph database in this regard to provide the shortest path results in response to the received graph database query. In addition, database system 108 can provide other optimizations in processing the query, as described further herein.

Although it may be noted that the ordering of the paths as shown in table 700 of FIG. 7 implies a depth-first traversal of graph 300, it should be understood that examples are not restricted to any particular traversal algorithm. Indeed, the algorithm employed to perform traversal may vary depending on the type of graph (e.g. weighted edges, negative edge weights) and/or particular type of shortest path problem being solved. In examples, shortest path algorithms may include Dijkstra's, Bellman-Ford, A* search, Floyd-Warshall, Johnson's, Vitterbi, and/or other algorithms. Examples may implement recursive versions of one or more of these algorithms to perform the shortest path traversal necessary to perform query 600, and/or may do so in various ways.

In addition, in an example, in receiving the graph database query at action 202, query pre-processor 110 can perform one or more pre-processing operations to generate a set of operators for the received graph database query. For example, query pre-processor 110 is configured to receive the graph database query (e.g., as submitted by query generating entity 130) and to perform certain operations thereon to generate a representation of the query that is suitable for further processing by query optimizer 112. Such pre-processing operations may include, but are not limited to, parser and algebrizer operations performed by parser and algebrizer components (not shown for ease of illustration). In an example, query pre-processor 110 can output a query processor tree that is a logical representation of query 600. In an example, query processor tree may be obtained by translating the original text of query 600 into a tree structure with leaf nodes representing table accesses and internal nodes representing relational operators such as relational join. Query optimizer 112 is configured to receive query processor tree output by query pre-processor 110, and to process the query processor tree to generate query plan for the query.

In method 200, at action 204, a received graph database query can be configured into one or more recursive CTEs. In an example, pre-processor 110, e.g., in conjunction with processor 104, memory 106, database system 108, etc., can convert the received graph database query into the one or more recursive CTEs. For example, pre-processor 110 can create a recursive CTE that represents at least a shortest path query portion of the received graph database query. An example is shown in FIG. 8. FIG. 8 shows a query 802 including a repeated MATCH expression, and a conceptual effective query generated by transformation of the query, according to an example. Query 802 of FIG. 8 is reproduced for convenience herein below:

SELECT*FROM n1, n2, n3, e1, e2
WHERE MATCH(shortest_path(n1(–(e1)->n2–(e2)->n3)+))

Effective query 804 of FIG. 8 shows a conceptual expansion of query 802 and its repeated match predicate (i.e., "match (shortestpath(n1(-(e1)->n2-(e2)->n3)+)) into an equivalent anchor member 808, recursive member 810 and outer select query 812 of a recursive CTE. In an example, query optimizer 112 can further modify/refine this effective query 804 with the recursive CTE to generate a more optimal and/or efficient query, as described further herein, for obtaining desired query results.

In converting the received graph database query at action 204, optionally at action 206, a first recursive CTE for a shortest path statement can be generated in a direction defined by the shortest path statement and/or a second recursive CTE for the shortest path statement can be generated in an opposite direction. In an example, query pre-processor 110, e.g., in conjunction with processor 104, memory 106, database system 108, etc., can generate the first recursive CTE for the shortest path statement in the direction defined by the shortest path statement (e.g., from start node n1 to end node n2 and from start node n2 to end node n3, as shown in the example in FIG. 8) and/or can generate the second recursive CTE for the shortest path statement in the opposite direction (e.g., from start node n3 to end node n2 and from start node n2 to end node n1 for the example in FIG. 8). In this example, the optimizations described herein can be applied to both recursive CTEs to determine which direction is more efficient in performing the graph database query. In addition, for example, query pre-processor 110 can generate additional or alternative combinations of recursive CTEs for applying the optimizations to determine an optimal recursive CTE. In an example, query pre-processor 110 can generate one or more recursive CTEs that start at both ends of the requested path and terminate somewhere in the middle, as described further herein.

Figure 9:
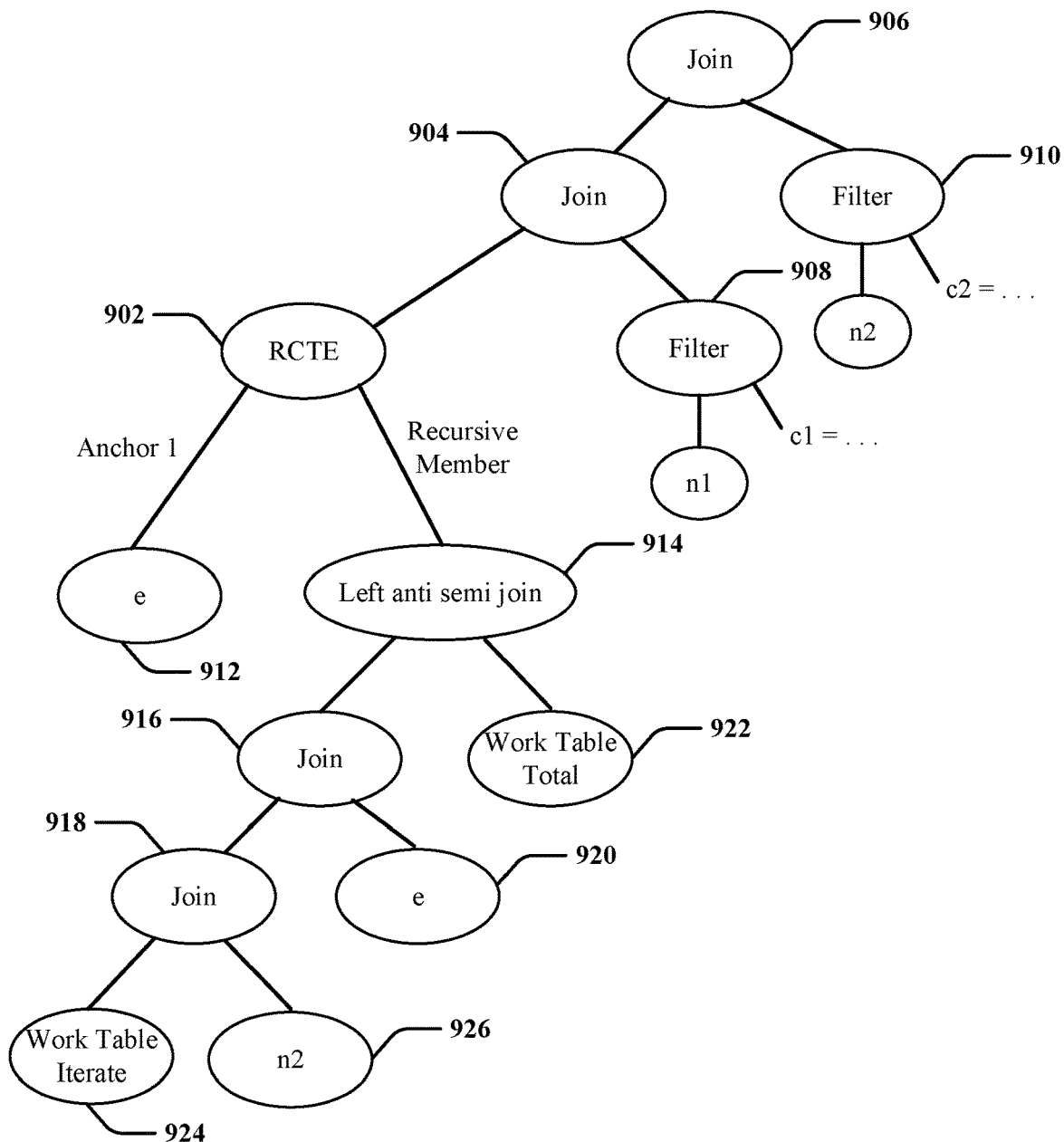
FIG. 9 shows a unidirectional query process tree, according to an example.
Figure 10:
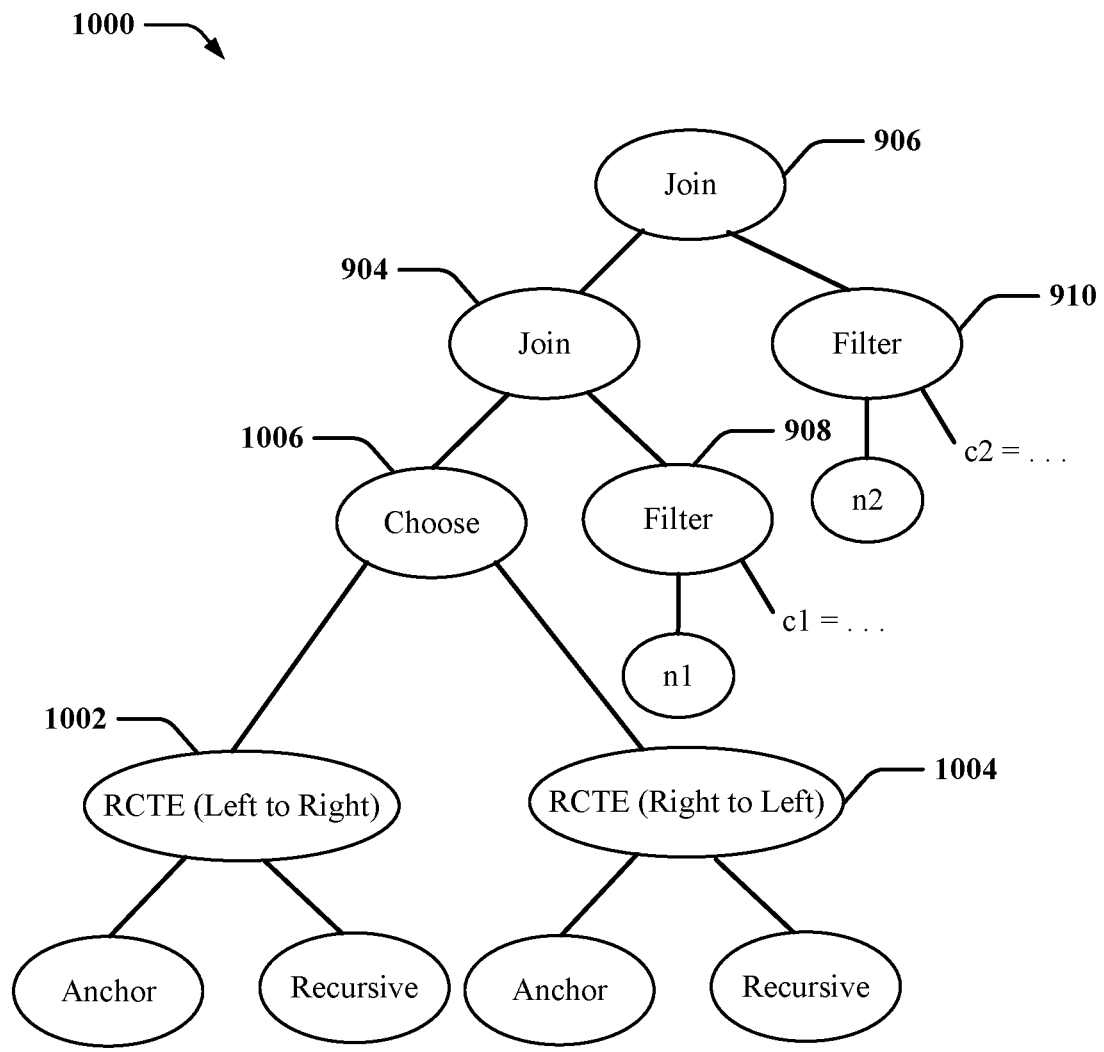
FIG. 10 shows a query process tree with a selection to select one of multiple paths of the query process tree, according to an example.

Examples of query process trees are illustrated in FIGS. 9 and 10. FIG. 9 illustrates an example of a unidirectional query process tree output by a query pre-processor 110 for a statement such as ShortestPath (n1 (-(e)->n2)+) AND n1.c1= . . . AND n2.c2= . . . . In this example, query pre-processor 110 generates a recursive CTE (RCTE) 902 (also referred to as a "graph iterate") for the ShortestPath statement, where the RCTE is a child of Join 904, joining the RCTE 902 with a filter 908 for n1.c1= . . . . Join 904 is a child of Join 906, joining Join 904 with a filter 910 for n2.c2= . . . . RCTE 902 has an anchor member for edge table e 912, and a recursive member as a left anti semi join 914 for the ShortestPath statement. In this example, query pre-processor 110 can generate the recursive member which includes left anti semi join 914, joins 916 and 918, and scans of work table total 922, edge table results for edges e 920 connecting starting node n1 and ending node n2 (through one or more additional edges), node table n2 926, etc. These operators can extend the previously identified paths stored in work table iterate 924 by one additional hop and filter out any new paths that terminate at previously reached nodes. In this example, newly discovered paths to previously unreached nodes can be added to the work table iterate 924.

In an example, the left anti semi join 914 can filter out newly found paths that reach nodes that have already been found in a prior iteration. The predicate for this left semi join (for this specific example) can be "e.to_id=wt_total.node_id," where wt_total can correspond to Work Table Total 922 that can eventually include all nodes that have been reached. There may also be a "distinct" operator below this semi join that discards duplicate nodes. In some other examples, a more complex shortest path with extra edges in the pattern (e.g., the one in FIG. 8) may have extra joins in both the anchor and the recursive sections.

In method 200, at action 208, multiple alternative processes for executing the recursive CTE(s) can be generated based on the recursive CTE(s). In an example, alternative generating component 122, e.g., in conjunction with processor 104, memory 106, database system 108, query optimizer 112, etc., can generate, based on the recursive CTE(s), multiple alternative processes for executing the recursive CTE(s). For example, alternative generating component 122 can create the multiple alternative processes for exploration as processes by which to process the graph database query. In this regard, alternative generating component 122 can apply various optimizations to the recursive CTE(s) to generate each of the alternative processes.

In one example, in generating at least one alternative process, optionally at action 210, a node filtering statement defined in the recursive CTE can be moved into an anchor member of the recursive CTE. In an example, alternative generating component 122, e.g., in conjunction with processor 104, memory 106, database system 108, query optimizer 112, etc., can move the node filtering statement defined outside of the recursive CTE into the anchor member of the recursive CTE. In an example, this may reduce the number of start nodes in the recursive section. For example, the node filtering statement may include a JOIN statement (e.g., in T-SQL), and moving the JOIN statement into the recursive section may allow for performing a less number of recursive processes when executing the query (e.g., as the results on which recursion is performed may be decreased by the filtering associated with the JOIN statement). In another example, the node filtering statement may refer to another recursive CTE that can be pushed into the anchor node of the recursive CTE (e.g., where the query includes additional shortest path queries or other queries that are translated into recursive CTEs by the query pre-processor 110) to likewise allow for performing a less number of recursive processes when executing the query (e.g., as the results on which recursion is performed may be decreased by the filtering associated with the recursive section). Alternative generating component 122 can generate one or more alternatives where one or more of multiple possible node filtering statements are moved in order to explore the various alternatives and/or determine an associated cost, as described further herein. In one example, alternative generating component 122 can move the node filtering statement in T-SQL syntax received from the query pre-processor 110 or in a query processor tree output by query pre-processor 110, as described above (e.g., by moving a node in the query processor tree representing the node filtering statement down to a leaf node representing an anchor member of the recursive CTE).

FIG. 10 illustrates an example of one alternative to facilitate selecting of one of multiple paths of a query process tree output by query pre-processor 110 described with reference to FIG. 9. In this example, alternative generating component 122 can generate the RCTE 1002 (which may be similar to RCTE 902 in the example of FIG. 9 for left-to-right traversal of the graph) and another RCTE 1004 for right-to-left traversal of the graph, each having respective anchor and recursive members. The RCTEs 1002 and 1004 can be part of a Choose 1006 to select one or the other RCTE 1002 or 1004 during optimization of the query. For example, the query optimizer 112 can start with the left-to-right and right-to-left alternatives and can generate further alternative processes by using transformations described herein, costs of the resulting alternative, etc. Query optimizer 112 can choose the best (e.g., lowest cost) alternative. As with the previous RCTE 902 in FIG. 9, the RCTE resulting from the Choose 1006 can be joined at Join 904 with Filter 908, etc. This can allow query pre-processor 110 to setup traversal in both directions so the query optimizer 112 can determine which is more efficient.

Figure 11:
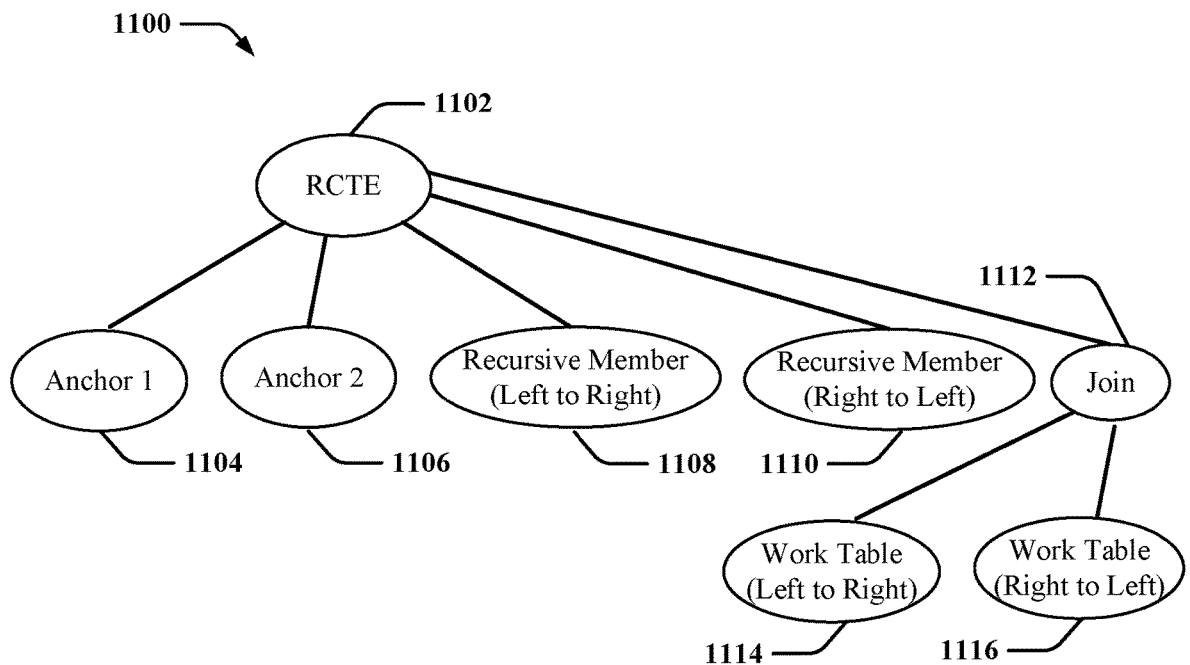
FIG. 11 shows a bidirectional query process tree, according to an example.

FIG. 11 illustrates an example of a bidirectional query process tree output by a query pre-processor 110 for a statement such as ShortestPath (n1(–(e)->n2)+). In this example, query pre-processor 110 generates a recursive CTE (RCTE) 1102 with anchor members anchor 1 1104 and anchor 2 1106, a recursive member 1108 for left to right traversal of the ShortestPath statement, and a recursive member 1110 for right to left traversal of the ShortestPath statement. In this example, query pre-processor 110 can also include a join 1112 to join the work table 1114 from the recursive member 1108 and the work table 1116 from the recursive member 1110. Query pre-processor 110 can generate the recursive member 1108 as similarly described with respect to recursive member (e.g., left anti semi join 914) in FIG. 9. In addition, query pre-processor 110 can generate the recursive member 1110 based on adjusting the join predicates for joins 914, 916, and 918 and inserting the results into a separate set of worktables. This can allow query execution engine 114 to alternate between the left-to-right and right-to-left portions of the plan based on the size of the intermediate results (or other criteria).

Figure 12:
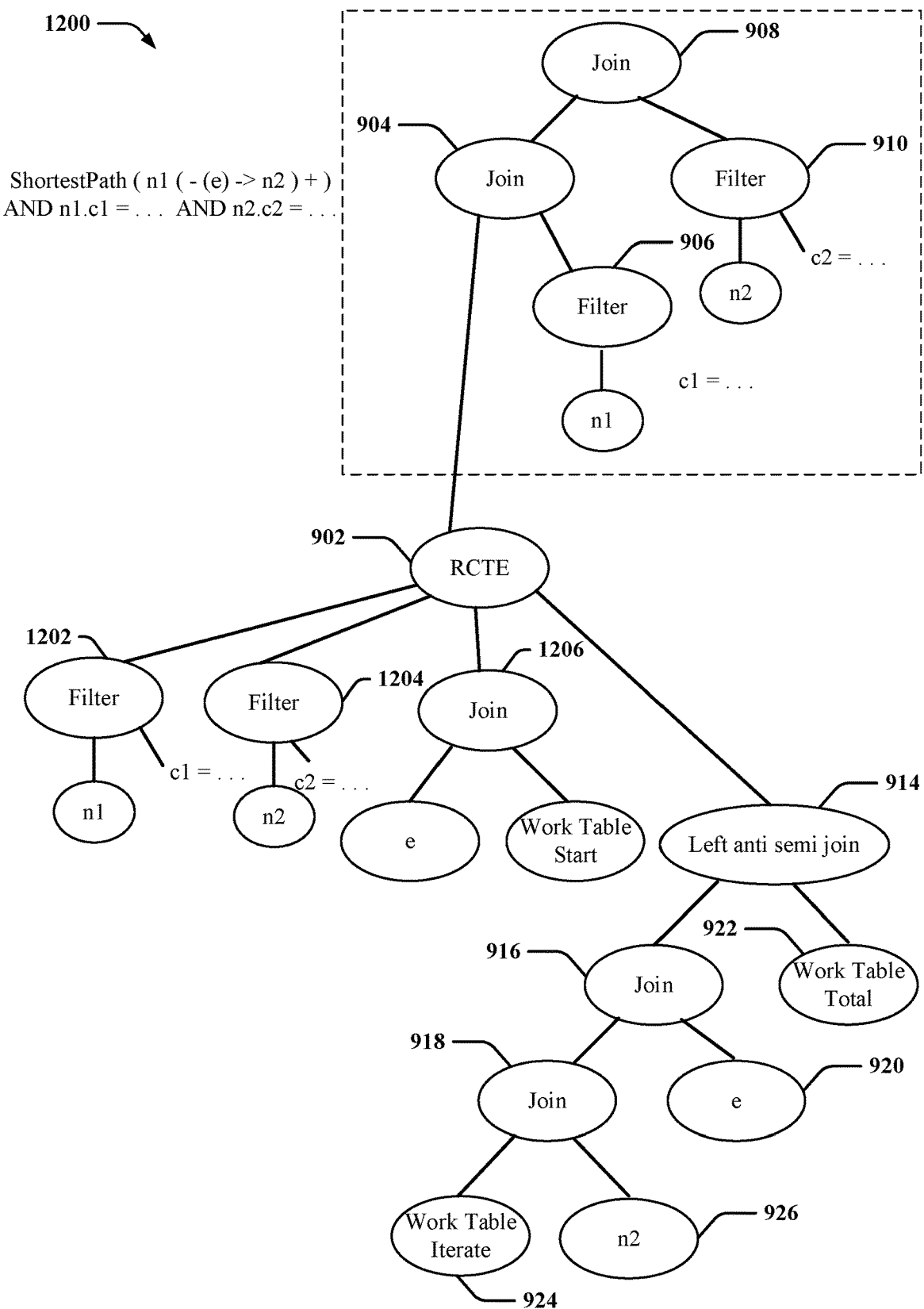
FIG. 12 shows alternative query process trees for more than one recursive CTE, according to an example.

FIG. 12 illustrates an example of a query process tree of another alternative process for the query process tree of FIG. 9. For example, query process tree 1200 can represent a statement such as ShortestPath (n1 (–(e)->n2)+) AND n1.c1= . . . AND n2.c2= . . . . In this example, query pre-processor 110 generates RCTE1 902 for ShortestPath (n1 (–(e)->n2)+), as described in reference to FIG. 9. RCTE 902 has a Join 1206 in place of the original anchor 912. In addition, RCTE 902 has recursive member in the form of left anti semi join 914, as described. In this alterative, alternative generating component 122 can push the previous Joins 904, 906 and/or Filters 908, 910 down to anchor members of RCTE 902, shown as Filters 1202 and 1204, to collect the set of start and end nodes that may eventually be stored in work tables, and can be used to filter the set of start nodes, identify if a path has reached an end node, and/or compute if all possible paths have been found at execution time (e.g., where the total number of possible paths=number of start nodes multiplied by number of end nodes). For example, the start nodes can be stored in the work table start (wt_start) based on a node identifier (e.g., as wt_start.node_id).

In addition, for example, the Join 1206 can be a left semi join to discard edges that do not originate from the start node. The predicate—not shown in the drawing—for this left semi join (for this specific example) can be "e.from_id=wt_start.node_id." In an example, query optimizer 112 can make changes to the recursive member as part of the standard optimization process (e.g., the joins may be reordered and the operators can be transformed from logical to physical operators, as described further herein). Moreover, in an example, the joins 904, 908 from query process tree 900 in FIG. 9 can also optionally be retained (e.g., as another alternative process for evaluation or otherwise), along with being added as an anchor member of RCTE 902.

FIG. 13 illustrates an example of query process trees for more than one recursive CTE, and creating an alternative process, as described herein. For example, query process tree 1300 can represent a statement such as ShortestPath (n1 (–(e)->n2)+) AND ShortestPath (LastNode (n2) (–(e)->n3)+). In this example, query pre-processor 110 generates RCTE1 1302 for ShortestPath (n1 (–(e)->n2)+) having an anchor member anchor 1 1304 and recursive member recursive 1 1306, and generates RCTE2 1308 for ShortestPath (LastNode (n2) (–(e)->n3)+) having an anchor member anchor 2 1310 and recursive member recursive 2 1312. Query pre-processor 110 also generates a join 1314 for RCTE1 1302 and RCTE2 1308, and a join 1316 for join 1314 and n1 1318. In generating one example of an alternative process, as described above, alternative generating component 122 can push down RCTE1 1302, join 1314, into anchor members of RCTE2 1308, and push down join 1316 into an anchor member of RCTE1 1302.

In method 200, at action 212, a cost associated with each of the multiple alternative processes can be determined. In an example, cost computing component 126, e.g., in conjunction with processor 104, memory 106, database system 108, query optimizer 112, etc., can determine the cost associated with each of the multiple alternative processes. For example, cost computing component 126 can compute the cost associated with each of the multiple alternatives based on the syntax or query processor tree output associated with each alternative. As described, the multiple alternatives can include, for each of multiple recursive CTEs, an arrangement of instructions or nodes of a corresponding query processor tree to achieve various optimizations thereof.

In an example, in determining the cost at action 212, optionally at action 214, cardinality parameters can be determined. In an example, cardinality determining component 124, e.g., in conjunction with processor 104, memory 106, database system 108, query optimizer 112, etc., can determine cardinality parameters of one or more tables that may be retrieved as part of executing the alternative process. In one example, cardinality determining component 124 can determine the cardinality parameter(s) (e.g., for a set of logical operators in the query) as follows. For a recursive match operator match(n1-((e)->n2)+), an edge table can include from_id and to_id's of all edges from n1 and n2 node tables. From the statistics, cost computing component 126 can estimate the distinct count and frequency of from_id and to_id in edge table, and may derive the following:

Distinct count(from_id)=Number of different start nodes
Frequency(from_id)=out degree of each start node (fan-out)
Distinct count(to_id)=Number of different end nodes
Frequency(to_id)=in degree of each end node (fan-in)

Where |e| is the cardinality of edge table then there are |e| nodes in tree. If fan-in=1 and fan-out >1, then each end node can appear once in edge table (it's a tree). Then the height of tree is:

Let d=fan-out
Height h~=Log d |e|

When fan-in >1 and fan-out >1, start and end nodes appear more than once in edge table. Cardinality determining component 124 can convert this graph into tree, if the nodes that appear more than once are represented as leaf nodes, and the height of the tree, which can be the diameter of the graph, is:

Let d=Max(out degree, in degree)
Height h~=Log d |e|

In any case, cost computing component 126 can compute a cost of the alternative process as a function of one or more of the diameter, fan-out, number of start nodes, and/or number of end nodes, and may accordingly determine an optimal alternative process for executing on the relational data store 116 to obtain query results in response to the received graph database query.

In an example, in determining the cost at action 212, optionally at action 216, logical operators can be converted to physical operators. In an example, cost computing component 126, e.g., in conjunction with processor 104, memory 106, database system 108, query optimizer 112, etc., can convert the logical operators (e.g., for at least one of the multiple alternative processors for which a cost is being determined) to physical operators. For example, cost computing component 126 can convert a syntax or associated query processor tree of logical operators into one or more sets of physical operators for executing the query on the database system 108, or at least for obtaining associated cost metrics. For example, cost computing component 126 may convert the syntax or associated query processor tree into physical operators that may be used to obtain index information for each operator, where the index information may include a number of rows in a corresponding table. For example, cost computing component 126 may convert a join predicate into a hash join function, where the cost can be computed based on cardinality of the tables for the join function and the join result, as described further herein.

In this regard, in determining the cost at action 212, optionally at action 218, the cost of the physical operators can be determined. In an example, cost computing component 126, e.g., in conjunction with processor 104, memory 106, database system 108, query optimizer 112, etc., can determine the cost of the physical operators. For example, cost computing component 126 can determine a cost for a set of the physical operators based on the cardinality parameters, a function result, available system resources (e.g., processor, memory, input/output, etc.), whether the data is expected to be in persistent or non-persistent storage, and/or the like.

In this regard, in determining the cost at action 212, optionally at action 218, the cost can be determined based on a target number of paths being discovered. In an example, cost computing component 126, e.g., in conjunction with processor 104, memory 106, database system 108, query optimizer 112, etc., can determine the cost based on the target number of paths being discovered. For example, cardinality determining component 124 can determine a target number of paths based on a number of start nodes determined from the shortest path statement (e.g., based on an initial query for the start nodes) multiplied by a number of end nodes determined from the shortest path statement (e.g., based on an initial query for the end nodes). In this example, cardinality determining component 124 can determine the cardinality based on an early termination, which may result in cost computing component 126 computing a lower cost for the given alternative process (as compared to other alternative processes).

In another example, in method 200, optionally at action 220, a recursive member of the recursive CTE can be reoptimized. In an example, query optimizer 112, e.g., in conjunction with processor 104, memory 106, database system 108, etc., can reoptimize the recursive member of the recursive CTE. For example, where query optimizer 112 steps through the recursive section of the recursive CTE representing the alternative process, moving the node filtering statement(s), as described above, may render the previously computed cost inaccurate and the previously selected alternative process for the recursive member suboptimal (e.g., when compared to other alternative processes). Thus, for example, query optimizer 112 can effectively discard one or more physical operators representing the recursive section, and/or can generate new logical or physical operators based on the reoptimization. Query optimizer 112 can determine new cardinalities, costs, etc., as described above, of parts of the plan that may result from the reoptimization (e.g., based on pushing down the node filtering statement). Query optimizer 112 may select the alternative process for generating the multi-step sequence based on the reoptimized process, re-computed costs, etc., as described below.

In method 200, at action 222, one of the multiple alternative processes can be converted into a multi-step sequence based on the cost. In an example, query optimizer 112, e.g., in conjunction with processor 104, memory 106, database system 108, etc., can convert, based on the cost, the one of the multiple alternative processes into the multi-step sequence. For example, query optimizer 112 can determine the alternative process (e.g., and/or one of multiple sets of physical operators that may represent the one of the multiple alternative processes) with a lowest cost or with less than a threshold cost. In an example, query optimizer 112 may choose an alternative process that may not have the lowest cost but may have other desirable properties (e.g., a less number of operations in the sequence) so long as the alternative process is less than a threshold cost, has a cost difference with the lowest cost alternative process that is less than a threshold, etc.

Figure 14:
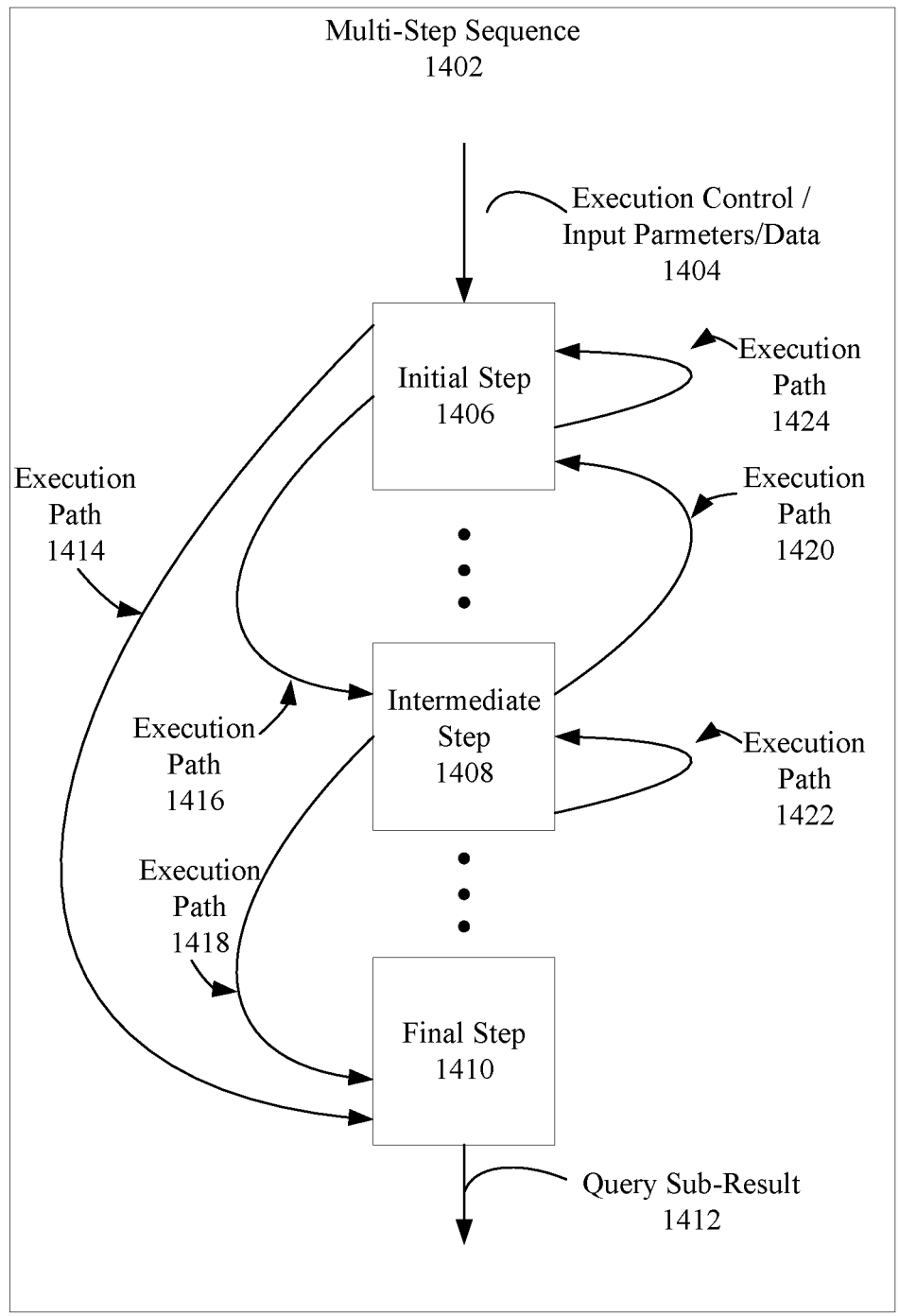
FIG. 14 shows an example multi-step sequence, according to an example.

An example is shown in FIG. 14. For instance, FIG. 14 shows an example multi-step sequence 1402 that may represent physical operators for performing graph queries, and other types of queries, according to an example.

In an example, multi-step sequence 1402 includes physical sequence operators by way of an initial step 1406, an intermediate step 1408, and/or a final step 1410. Although multi-step sequence 1402 is depicted in FIG. 14 as having three steps, such a configuration is illustrated as a typical example, and other examples of a multi-step sequence may include fewer steps or greater numbers of execution steps. Moreover, a multi-step sequence may include more than one final step, with the particular final step to execute being left as a runtime decision. Note that a multi-step sequence may also be a single step that is repeated one or more times. Further examples are directed to just a single step being present. Each of step 1406 and 1408 may be configured to pass execution control to one or more other steps of multi-step sequence 1402 via one or more execution paths 1414-1424. Final step 1410 is configured to pass execution control and query sub-result 1412 back to a query execution component such as query execution engine 114 as depicted in FIG. 1, and as discussed in greater detail herein below. Examples of multi-step sequence 1402, including functional aspects enabled by multi-step sequence 1402, are generally described. Such examples are described in terms of steps 1406, 1408 and 1410, but are not limited to multi-step sequences containing only these particular steps or types of steps.

In examples, multi-step sequence 1402 of FIG. 14 may be understood by regarding instances of multi-step sequence 1402 as an ordinary sequence operator, but with relaxed execution constraints and expanded inter-step communication capabilities. An ordinary sequence operator typically drives wide update plans, and executes each child of the sequence in a purely sequential order, first to last. Each child of such a sequence typically updates a different object, and returns only those rows generated by the last child of the sequence.

A multi-step sequence such as multi-step sequence 1402, on the other hand, is a more flexible sequence operator with a number of different capabilities. For example, examples of multi-step sequence 1402, when included as a physical operator, may enable one or more of the following capabilities depending on the particulars of the generated multi-step sequence:

sub-division of a query plan into separate steps that may be executed in an arbitrary order, and may be repeated to permit flexible, performant recursive execution;

communication of arbitrary data including full or partial result sets between steps;

multiple alternative plans for one or more steps, with execution choice between plans deferred until execution (e.g., serial plan vs parallel plan depending on cardinality determined during execution);

adaptation between steps including: parallelism, adaptive memory grants to account for over or underestimation of memory needs, cardinality estimates; and/or applicability to a number of applications including: interleaved execution, parameter sensitive plans, and/or bidirectional execution.

In an example, initial step 1406, intermediate step 1408 and final step 1410 of multi-step sequence 1402 may each comprise a single physical SQL query operator. In other examples, however, steps of multi-step sequence 1402 may comprise one or more physical SQL query operators. In an example, physical operators may include any type of physical operator, such as for example, hash match, table insert, merge join, nested loops, index insert, non-clustered index update, parallelism, sort, split, stream aggregate, table scan and other types of SQL physical operators.

When an instance of multi-step sequence 1402 is executed, initial step 1406 of multi-step sequence 1402 is the first step of the multi-step sequence to be executed. In an example, initial step 1406 is configured to execute to generate initial step results, and then pass execution control to a different step or to itself. In some examples, however, depending on the step results generated by initial step 1406, execution control may pass to any other step including intermediate step 1408 by passing execution control via execution path 1416. Likewise, initial step 1406 may pass execution control to final step 1410 via execution path 1418. Alternatively, initial step 1406 may pass execution control to any other steps that may be included in multi-step sequence 1402 (including final step 1410, the step that determines execution should terminate), and as represented by the sets of vertical ellipses depicted in FIG. 14 (execution paths not shown). For the purposes of describing examples of multi-step sequence 1402, initial step 1406 may be assumed to pass execution control to intermediate step 1408 via execution path 1416.

In examples, intermediate step 1408 of multi-step sequence 1402 in FIG. 14 may be configured to receive execution control from a previously executed step of multi-step sequence 1402. After receiving execution control, examples that include intermediate step 1408 may be configured to execute to generate intermediate step results, and thereafter pass execution control to any other step in multi-step sequence 1402, including intermediate step 1408 itself. Examples may include a number of useful features that are enabled by permitting multi-step sequence steps such as intermediate step 1408 to execute itself. By permitting intermediate step 1408 (as well as other instances of intermediate steps like intermediate step 1408) to pass execution control to any other step in multi-step sequence 1402, multi-step sequence 1402 is enabled in examples to execute steps in arbitrary order, to execute alternative sub-plans according to actual step results determined at runtime, to adapt to the memory or performance needs of the query depending on cardinality estimates computed at run time, and to enable other features as discussed above.

After executing to generate intermediate step results, intermediate step 1408 may pass execution control to any other step of multi-step sequence 1402. Intermediate step 1408 may run only a single time to generate intermediate step results, and thereafter pass execution control to another step. Likewise, even where intermediate step 1408 is being executed recursively (i.e., by repeatedly executing itself to operate on results generated by the previous iteration), typically a termination condition or recursion depth limit will eventually be reached, and intermediate step 1408 can pass execution control to some other step. Note, in other examples, a step could execute repeatedly without terminating (i.e. an infinite loop). For the purposes of describing examples of multi-step sequence 1402, it is assumed that intermediate step 1408 passes execution control to final step 1410 via execution path 1418.

In examples, final step 1410 of multi-step sequence 1402 in FIG. 14 may be configured to receive execution control from any previously executed step of multi-step sequence 1402, including from intermediate step 1408 via execution path 1418. Final step 1410 of multi-step sequence 1402 is configured to be the final execution step in multi-step sequence 1402. In examples, final step 1410 is configured to generate query sub-result 1412 comprising the results for the entire execution of multi-step sequence 1402. In examples, query sub-result 1412 may be based in part on any prior step results generated by steps of multi-step sequence 1402. After receiving execution control and generating query sub-result 1412, examples of multi-step sequence 1402 are enabled to pass query sub-result 1412 and execution control to any other query operator, step, step sequence or multi-step sequence, or back to query execution engine (e.g., query execution engine 114 of FIG. 1). Examples may generate and incorporate instances of multi-step sequence 1402 in physical operators for performing the received graph database query, and may do so in various ways.

Figure 15:
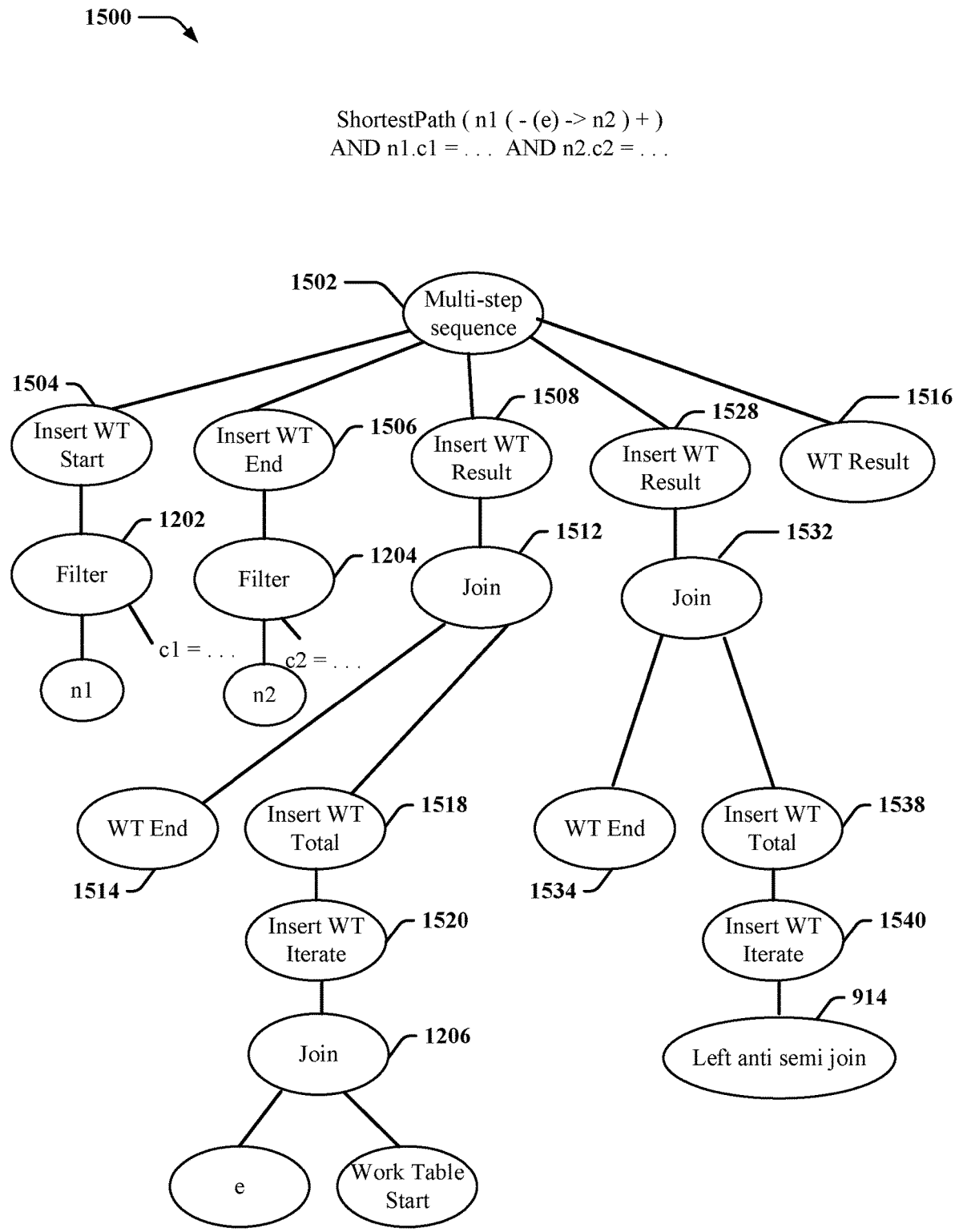
FIG. 15 shows an example multi-step sequence output, according to an example.

For example, query execution engine 114 can transform each recursive CTE into a multi-step sequence. The recursive CTE children can become children of the sequence. Query execution engine 114 can also add some extra operators to accumulate the intermediate results in temporary worktables (e.g., as shown in FIGS. 9 and 10, and further explained herein) and can add a final "output" child to output the final result to one or more next steps of the plan. In addition, in an example, query execution engine 114 can add other operators in converting the alternative process into a multi-step sequence. An example is shown in FIG. 15, which illustrates an example multi-step sequence 1502 output for the query process tree in FIG. 12. In FIG. 15, multi-step sequence 1502 can include results of the new anchor members 1202, 1204 from FIG. 12 inserted into work tables (WT) start 1504 and WT end 1506, respectively.

Identical operators insert work table result 1508, 1528, right semi join 1512, 1532, WT end 1514, 1534, insert WT total 1518, 1538, and insert WT iterate 1520, 1540 can be added between multi-step sequence 1502 and original anchor join 1206 and between multi-step sequence 1502 and recursive member as left anti semi join 914, respectively. Insert WT iterate 1508 can accumulate paths newly discovered by anchor 1106 and/or insert WT iterate 1528 can accumulate paths newly discovered by recursive member as left anti semi join 914 that can be processed in a later iteration of recursive member as left anti semi join 914. Insert WT total 1518 can accumulate the complete list of paths that have been discovered by anchor 1106, and/or insert WT total 1538 can accumulate the complete list of paths that have been discovered across all iterations of recursive member as left anti semi join 914 and both insert WT total 1518, 1538 can insert the paths into WT total 922.

Right semi join 1512, 1532 with WT end 1514, 1534 can select any paths that terminate at an end node. Insert WT result 1508, 1528 can accumulate all paths from a start to an end node, and insert the paths into WT result 1516, and a final output step can return the contents of WT result 1516. In one example, the multi-step sequence may early terminate execution as soon as a target number of paths are found. This can result from pushing filters to the start and end anchors so the total number of paths can be computed, as described (e.g., counting only one path from each unique start/end pair or nodes), and then terminating when the number of paths have been found.

In method 200, at action 224, the multi-step sequence can be executed on the database to retrieve a set of results in response to the received graph database query. In an example, query execution engine 114, e.g., in conjunction with processor 104, memory 106, database system 108, etc., can execute, on the database (e.g., relational data store 116), the multi-step sequence to retrieve the set of results in response to the received graph database query (e.g., results indicating shortest path, such as those in 706 in FIG. 7). For example, query execution engine 114 can perform the physical operators in the multi-step sequence (e.g., steps 1406, 1408, 1410, etc. of the multi-step sequence in FIG. 14) on the relational data store 116 to retrieve the corresponding results. In addition, in one example, database system 108 can send the results to the query generating entity 130.

Figure 16:
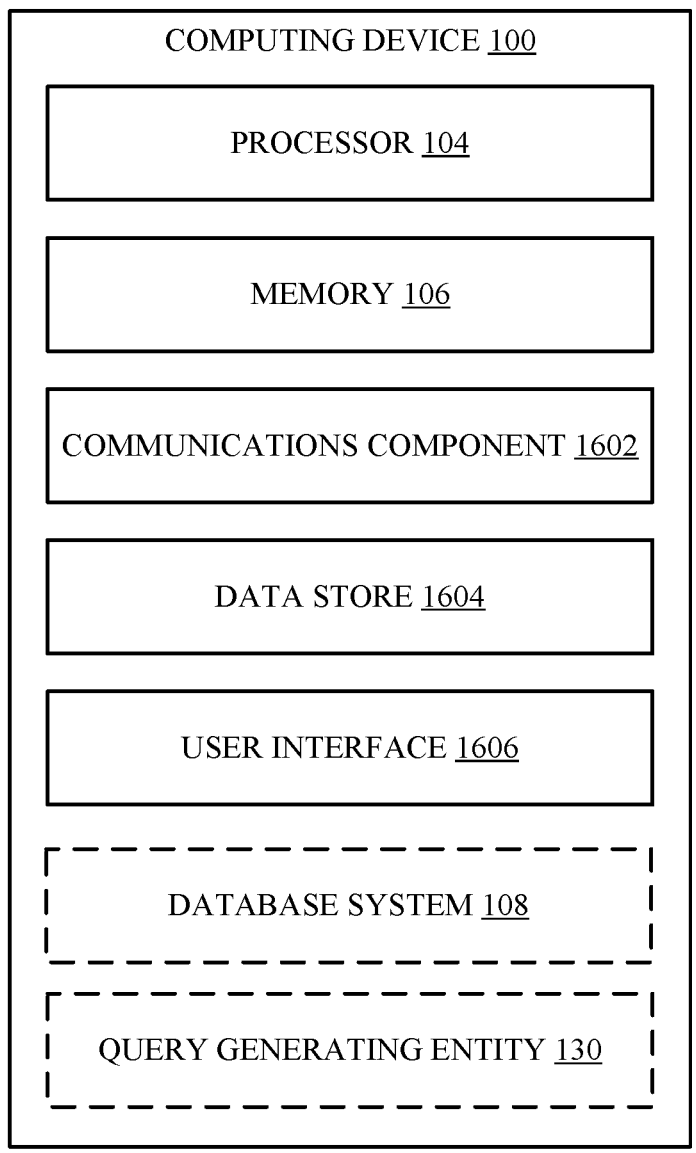
FIG. 16 is a schematic diagram of an example of a computing device for performing functions described herein.

FIG. 16 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as a database system 108, a query generating entity 130, and/or components thereof, as described herein, and/or other components of the computing device 100.

Further, computing device 100 may include a communications component 1602 that provides for establishing and maintaining communications with one or more other devices, parties, entities, etc. utilizing hardware, software, and services as described herein. Communications component 1602 may carry communications between components on computing device 100, as well as between computing device 100 and external devices, such as devices located across a communications network and/or devices serially or locally connected to computing device 100 (e.g., between computing device 100 executing the database system 108 and another computing device executing query generating component 130 and/or vice versa, as described). For example, communications component 1602 may include one or more buses, and may further include transmit chain components and receive chain components associated with a wireless or wired transmitter and receiver, respectively, operable for interfacing with external devices.

Additionally, computing device 100 may include a data store 1604, which can be any suitable combination of hardware and/or software, that provides for mass storage of information, databases, and programs employed in connection with examples described herein. For example, data store 1604 may be or may include a data repository for applications and/or related parameters not currently being executed by processor 104. In addition, data store 404 may be a data repository for an operating system, application, such as database system 108, a query generating entity 130, and/or components thereof, etc. executing on the processor 104, and/or one or more other components of the computing device 100. For example, data store 1604 can include relational data store 116.

Computing device 100 may also include a user interface component 1606 operable to receive inputs from a user of computing device 100 and further operable to generate outputs for presentation to the user (e.g., via a display interface to a display device). User interface component 1606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 1606 may include one or more output devices, including but not limited to a display interface, a speaker, a haptic feedback mechanism, a printer, any other mechanism capable of presenting an output to a user, or any combination thereof.

Computing device 100 can also include a database system 108 for storing graph database representations in a relational data store, query generating entity 130 for generating and submitting queries to the database system 108 and/or receiving results, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for executing a received graph database query, comprising:
    converting the received graph database query into a recursive common table expression (CTE), wherein converting the received database query comprises converting a shortest path statement to a first recursive CTE in a direction defined in the shortest path statement and converting the shortest path statement into a second recursive CTE in an opposite direction of the direction defined in the shortest path statement;
    generating, based on the recursive CTE, multiple alternative processes for executing the recursive CTE;
    determining a cost associated with each of the multiple alternative processes;
    converting, based on the cost, one of the multiple alternative processes into a multi-step sequence; and
    executing, on a database, the multi-step sequence to retrieve a set of results in response to the received graph database query.

2. The computer-implemented method of claim 1, wherein generating the multiple alternative processes comprises moving a node filtering statement defined outside of the recursive CTE into an anchor member of the recursive CTE.

3. The computer-implemented method of claim 2, wherein the node filtering statement is at least one of a join statement or a different recursive CTE.

4. The computer-implemented method of claim 2, wherein generating the multiple alternative processes comprises adding the node filtering statement defined outside of the recursive CTE into an anchor member of the recursive CTE while also retaining the node filtering statement as defined outside of the recursive CTE.

5. The computer-implemented method of claim 1, wherein determining the cost for a given alternative process of the multiple alternative processes is based at least in part on one or more cardinality parameters determined for the alternative process, wherein the one or more cardinality parameters include at least one of a diameter of a graph produced based on the alternative process, a fan-out of the graph produced based on the alternative process, a number of start nodes of the graph produced based on the alternative process, or a number of end nodes of the graph produced based on the alternative process.

6. The computer-implemented method of claim 5, wherein determining the cost for a given alternative process of the multiple alternative processes is based at least in part on converting the alternative process from a set of logical operators to a set of physical operators to determine the cost associated with the set of physical operators as a function of the one or more cardinality parameters.

7. The computer-implemented method of claim 1, wherein converting the one of the multiple alternative processes into a multi-step sequence comprises adding one or more operators to facilitate detecting early termination of the multi-step sequence.

8. The computer-implemented method of claim 1, further comprising reoptimizing a recursive member of the alternative process based on moving one or more node filtering statements.

9. A computing device for executing a received graph database query, comprising:
    a database storing data representing a graph database;
    a memory storing one or more parameters or instructions for querying the graph database; and
    at least one processor coupled to the memory, wherein the at least one processor is configured to:
        converting the received graph database query into a recursive common table expression (CTE) at least in part by converting a shortest path statement to a first recursive CTE in a direction defined in the shortest path statement and converting the shortest path statement into a second recursive CTE in an opposite direction of the direction defined in the shortest path statement;
        generating, based on the recursive CTE, multiple alternative processes for executing the recursive CTE;
        determining a cost associated with each of the multiple alternative processes;
        converting, based on the cost, one of the multiple alternative processes into a multi-step sequence; and
        executing, on the database, the multi-step sequence to retrieve a set of results in response to the received graph database query.

10. The computing device of claim 9, wherein the at least one processor is configured to generate the multiple alternative processes at least in part by moving a node filtering statement defined outside of the recursive CTE into an anchor member of the recursive CTE.

11. The computing device of claim 10, wherein the node filtering statement is at least one of a join statement or a different recursive CTE.

12. The computing device of claim 10, wherein the at least one processor is configured to generate the multiple alternative processes at least in part by adding the node filtering statement defined outside of the recursive CTE into an anchor member of the recursive CTE while also retaining the node filtering statement as defined outside of the recursive CTE.

13. The computing device of claim 9, wherein the at least one processor is configured to determine the cost for a given alternative process of the multiple alternative processes based at least in part on one or more cardinality parameters determined for the alternative process, wherein the one or more cardinality parameters include at least one of a diameter of a graph produced based on the alternative process, a fan-out of the graph produced based on the alternative process, a number of start nodes of the graph produced based on the alternative process, or a number of end nodes of the graph produced based on the alternative process.

14. The computing device of claim 13, wherein the at least one processor is configured to determine the cost for a given alternative process of the multiple alternative processes based at least in part on converting the alternative process from a set of logical operators to a set of physical operators to determine the cost associated with the set of physical operators as a function of the one or more cardinality parameters.

15. The computing device of claim 9, wherein the at least one processor is configured to convert the one of the multiple alternative processes into a multi-step sequence at least in part by adding one or more operators to facilitate detecting early termination of the multi-step sequence.

16. The computing device of claim 9, wherein the at least one processor is further configured to reoptimize a recursive member of the alternative process based on moving one or more node filtering statements.

17. A non-transitory computer-readable medium, comprising code executable by one or more processors for executing a received graph database query, the code comprising code for:

converting the received graph database query into a recursive common table expression (CTE) including code for converting a shortest path statement to a first recursive CTE in a direction defined in the shortest path statement and code for converting the shortest path statement into a second recursive CTE in an opposite direction of the direction defined in the shortest path statement;

generating, based on the recursive CTE, multiple alternative processes for executing the recursive CTE;

determining a cost associated with each of the multiple alternative processes;

converting, based on the cost, one of the multiple alternative processes into a multi-step sequence; and executing, on a database, the multi-step sequence to retrieve a set of results in response to the received graph database query.

18. The non-transitory computer-readable medium of claim 17, wherein the code for generating generates the multiple alternative processes at least in part by moving a node filtering statement defined outside of the recursive CTE into an anchor member of the recursive CTE.

19. The non-transitory computer-readable medium of claim 18, wherein the node filtering statement is at least one of a join statement or a different recursive CTE.

20. The non-transitory computer-readable medium of claim 18, wherein the code for generating generates the multiple alternative processes at least in part by adding the node filtering statement defined outside of the recursive CTE into an anchor member of the recursive CTE while also retaining the node filtering statement as defined outside of the recursive CTE.

* * * * *